United States Patent [19]
Groh et al.

[11] Patent Number: 5,070,664
[45] Date of Patent: Dec. 10, 1991

[54] THERMOPLASTIC COVER FOR STADIUM SEATING, PICNIC TABLES, BOAT DOCKS AND THE LIKE

[75] Inventors: A. Anthony Groh, Columbus; Philip H. Stobart, Worthington; John C. Wolff, Columbus, all of Ohio

[73] Assignee: Crane Plastics, Inc., Columbus, Ohio

[21] Appl. No.: 591,585

[22] Filed: Oct. 2, 1990

Related U.S. Application Data

[63] Continuation-in-part of Ser. No. 339,649, Apr. 18, 1989, abandoned.

[51] Int. Cl.$^5$ ............................................. E04F 11/16
[52] U.S. Cl. ..................................... 52/177; 297/218; 428/334
[58] Field of Search .................. 52/177, 6; 297/218, 297/219; 428/334

[56] References Cited

U.S. PATENT DOCUMENTS

| | | |
|---|---|---|
| 3,025,104 | 3/1962 | Murphy . |
| 3,266,545 | 8/1966 | Kruissink . |
| 3,353,867 | 11/1967 | Anderson . |
| 3,397,011 | 8/1968 | Sklaar . |
| 3,531,157 | 9/1970 | Duckett et al. . |
| 4,100,325 | 7/1978 | Summers et al. . |
| 4,424,292 | 1/1984 | Ravinovitch et al. . |

Primary Examiner—Richard E. Chilcot, Jr.
Attorney, Agent, or Firm—Porter, Wright, Morris & Arthur

[57] ABSTRACT

Rigid PVC or other weatherable capstock and a rigid thermoplastic substrate are coextruded to form a channel-shaped cover adapted for close fitting resilient engagement with a plank or beam. If the plank or beam is wooden, the rear marginal flange of the cover may be flared outwardly or inwardly, depending upon the proximity of the planks or beams to one another, and horizontally elongated fastener-receiving slots are provided in at least one leg of the cover. If the beam or plank is formed from metal, the rear marginal flange is inturned to provide a snap fit between the cover and the beam. End caps and connectors are provided to hold the cover in place on the metal beam.

11 Claims, 4 Drawing Sheets

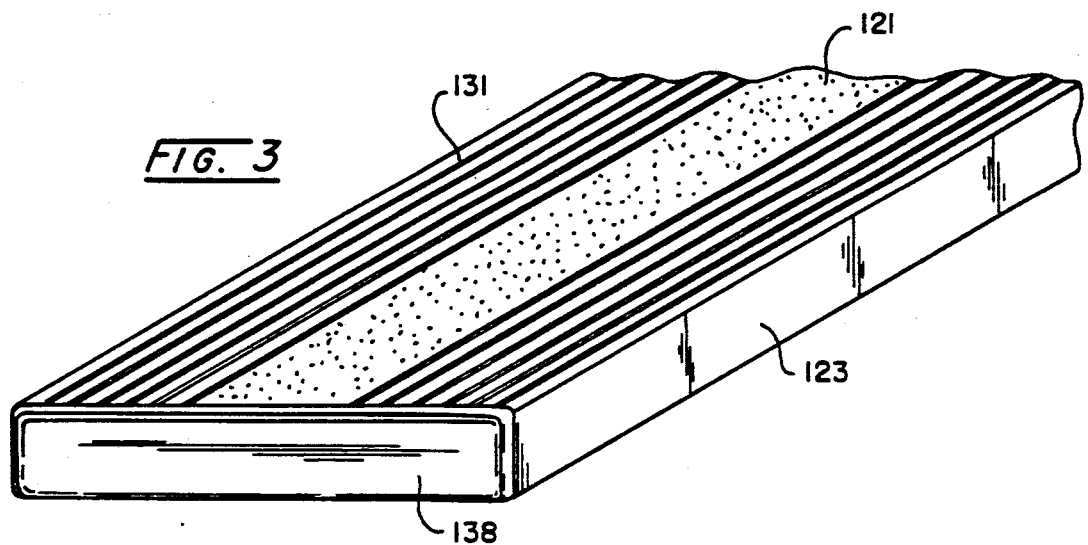
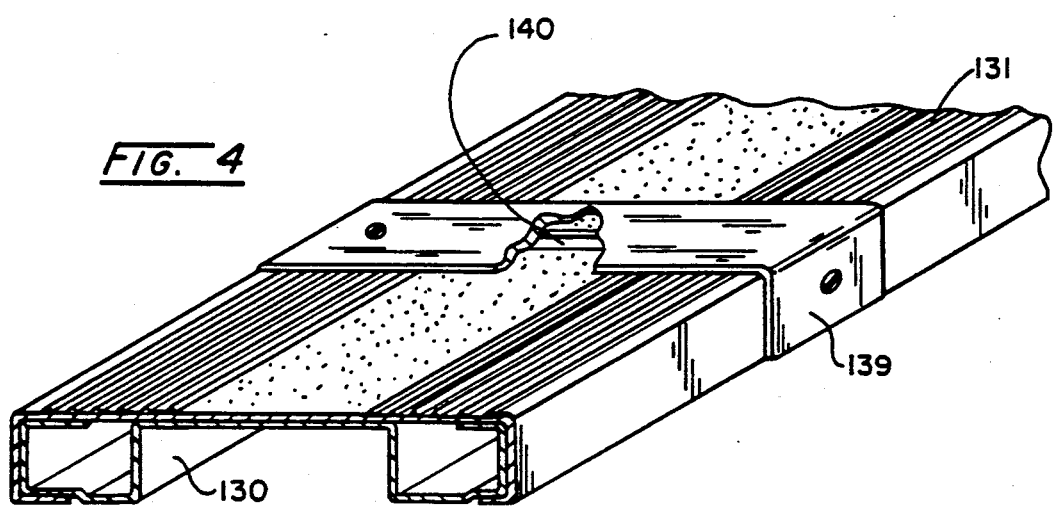

THERMOPLASTIC COVER FOR STADIUM SEATING, PICNIC TABLES, BOAT DOCKS AND THE LIKE

RELATED APPLICATION

This is a continuation-in-part of U.S. Patent Application Ser. No. 07/339,649 filed Apr. 18, 1989, now abandoned.

TECHNICAL FIELD

This invention relates to covers for outdoor seating, tables and docks and more particularly to those adapted to recover aging wooden planks or beams used for stadium seating, picnic benches and tables, and boat docks or to serve as original surfaces on newly installed metal beams or planks adapted for use in such structures.

BACKGROUND ART

Typically, the horizontally disposed wooden planks which form the seating surfaces on bleachers and other stadium benches need to be replaced, at considerable expense, about every seven (7) years. The wear and tear which fans and the elements exert on these structures is tremendous. Accordingly, the possibility of providing bleacher covers has occurred to others. Perhaps the most frequently used covers are formed from thermosetting plastics, such as polyester resin, and glass fibers. While such covers extend the life of the bench, they cannot expand and contract, are relatively brittle, and need to be painted frequently to prevent the glass fibers from migrating to the surface and becoming embedded in spectators' clothing and skin.

Seat covers formed from thermoplastics such as ABS and polyvinyl resins have also been attempted, at least on paper. However, some of these early thermoplastic covers were rather expensive, multicomponent molded structures. Others were so flexible and/or weakly attached to the underlying structure as to conclude that they were made for more passive crowds than presently attend stadiums in this and other countries. Furthermore, none of the early thermoplastic covers, so far as the present inventors are aware, made any provision for weatherability, i.e. inhibiting the deleterious effects of sunlight to which this group of synthetic resins is susceptible.

Vinyl house siding, wherein a base or matrix of relatively inexpensive thermoplastic material is co-extruded with a thin cap of weatherable resin, is well know. Of course, vinyl siding is not subjected to sports fans, nor is it operative in single, horizontally disposed profiles.

In some areas, wooden seats have been replaced with aluminum stringers or beams. Aluminum, however, is an increasingly expensive commodity, produces sharp burs when gouged, stains clothing if not anodized and conducts heat away from the body.

Accordingly, the present inventors were faced with the problems of creating a relatively inexpensive and comfortable cap or cover that would outlast comparable products, and that was adaptable, with minor changes, for use on old wooden, as well as new metal, beams or planks, as well as on new metal seating.

SUMMARY AND OBJECTS OF THE INVENTION

The present invention is an elongated one-piece cover for an outdoor plank or beam and comprises a weatherable, generally rigid thermoplastic cap coextruded with a generally rigid thermoplastic substrate, said cap and substrate defining a generally channel-shaped profile which includes a web portion adapted for close fitting engagement with an upper surface of the plank or beam, a pair of relatively opposing front and rear leg portions adapted for close fitting resilient engagement with front and rear side surfaces of the plank or beam, and front and rear marginal flanges extending from the front and rear leg portions, respectively, at least one of the marginal flanges being adapted for close fitting resilient engagement with an undersurface of the plank or beam.

One of the primary objects of the present invention is to provide a unitary, extruded thermoplastic cover capable of withstanding the destructive effects of weather and human use for an indefinite period of time. Another important object of the present seat cover is to be adaptable for use on either wood or metal planks or beams. Yet another object of the present seat cover is to be more durable and less expensive than currently available covers for old seats and new seating systems. Further objects and advantages of the present invention may become more readily apparent in light of the following drawings and detailed description of the preferred embodiments.

BRIEF DESCRIPTION OF THE DRAWINGS

FIG. 3 is a fragmentary perspective view similar to FIG. 2 of one end of a metal bleacher seat equipped with the second embodiment of the present thermoplastic cover;

FIG. 4 is a fragmentary perspective view similar to FIG. 3 of a connector for bridging the gap between end portions of adjacent covers for metal bleachers;

DETAILED DESCRIPTION OF THE PREFERRED EMBODIMENT

Figure 1:
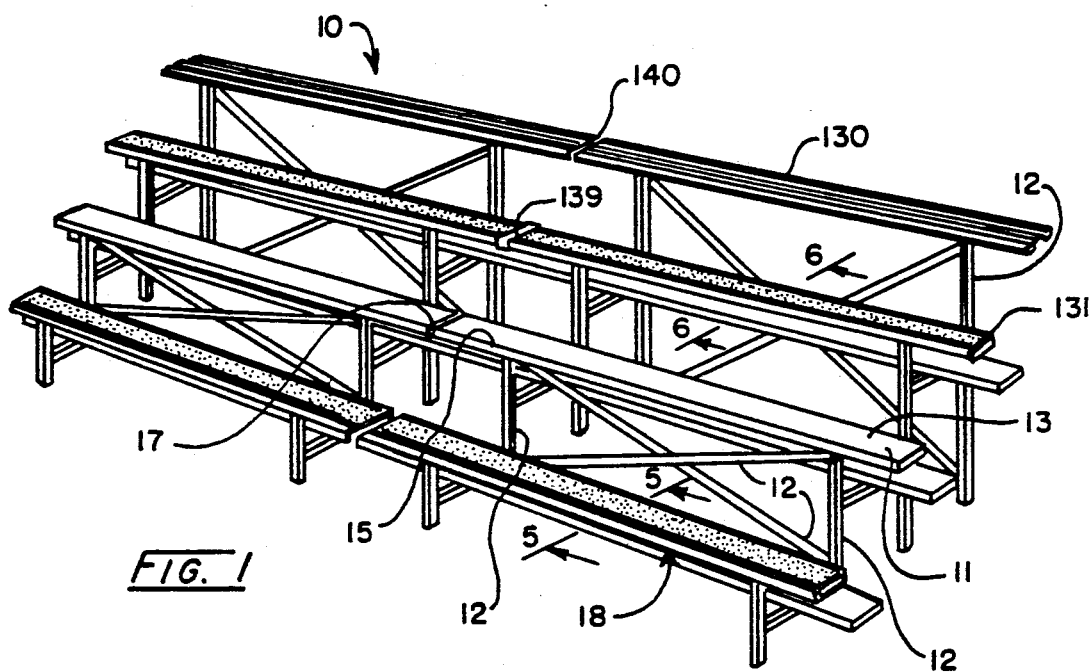
FIG. 1 is a perspective view of a tiered bleacher arrangement wherein alternative embodiments of the present invention are provided on the first and third tiers thereof.
Figure 5:
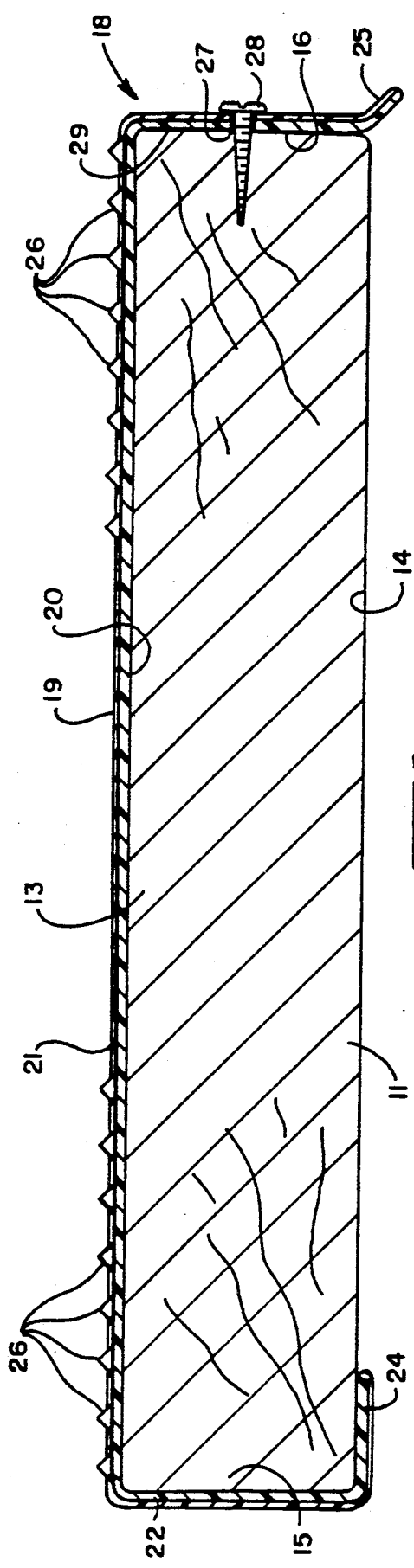
FIG. 5 is a further enlarged vertical sectional view taken along line 5—5 of FIG. 1 and particularly illustrates the construction and manner of attachment of the first embodiment of the present thermoplastic cover as adapted for use on wooden bleacher beams.

As indicated in FIG. 1, a bleacher, generally designated 10, is typically provided with a plurality of wooden stringers or beams 11. Each beam or bleacher seat 11 is an elongated structure mounted upon vertical struts and cross ties 12 and is formed with relatively opposing, generally horizontally disposed upper 13 and under 14 (FIG. 5) surfaces and with relatively spaced apart, generally vertically disposed front and rear side surfaces 15 and 16 (FIG. 5). The stringers or beams 11 are mounted on the struts and crossties 12 in end-to-end fashion, and a gap 17 is typically provided therebetween to allow for longitudinal expansion.

Figure 2:
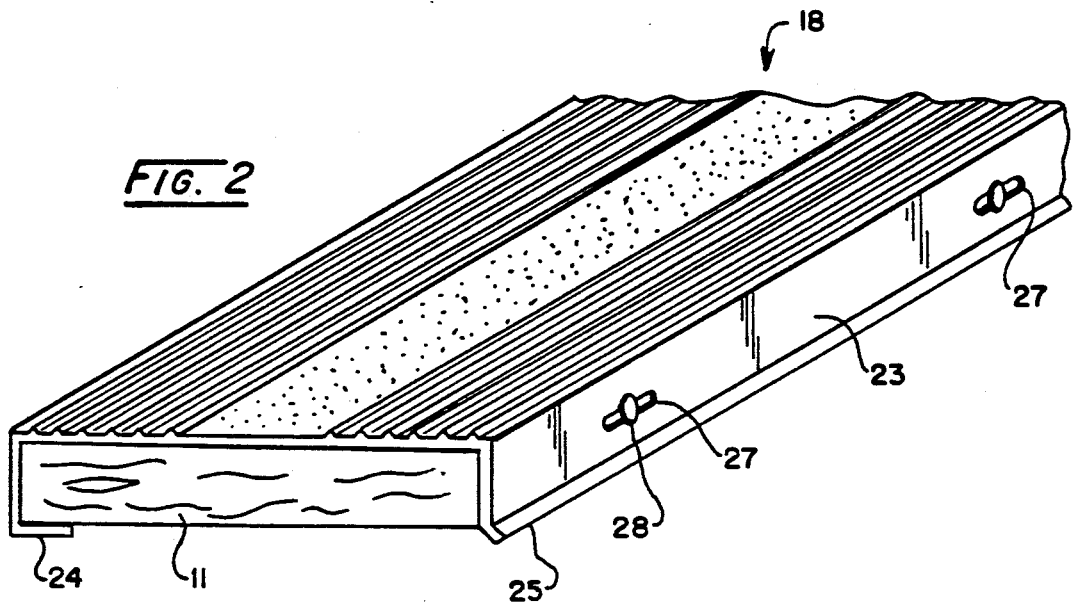
FIG. 2 is an enlarged fragmentary perspective view of one end of a wooden bleacher seat equipped with the first embodiment of the present thermoplastic cover.

As indicated in FIGS. 1, 2 and 5, a first embodiment of the present thermoplastic cover, generally designated 18, is adapted for recovering the above-described wooden stringers 11. Said cover 18 is an elongated, one-piece profile comprising a weatherable thermoplastic cap 19 coextruded with a thermoplastic substrate 20 to form, in combination, a top or web portion 21, relatively opposing side or leg portions 22 and 23, and front and rear marginal flange portions 24 and 25, respectively, extending from the legs. The top 21, sides 22 and 23 and at least the front flange portion 24 are adapted and configured to closely surround and resiliently engage the upper surface 13, edge surfaces 15 and 16 and undersurface 14, respectively, of the wooden stadium bench 11.

The capstock 19 is preferably between 15 and 25 mils in thickness and is composed of a rigid vinyl resin, such as PVC, ASA, or an acrylic polymer or copolymer to which titanium dioxide, colorants and other substances well known in the art for improving weatherability, have been added. See, U.S. Pat. No. 4,424,292 issued Jan. 3, 1984 to Ravinovitch et al and U.S. Pat. No. 4,100,325 issued July 11, 1979 to Summers, et al. The substrate 20 is a rigid vinyl polymer, such as PVC or acrylonitrile-butadiene-styrene (ABS) and is preferably between 55-85 mils in thickness. The capstock 19 and substrate 20 are coextruded in conventional fashion into the generally channel-shaped profile 18.

Preferably, the web portion 21 is formed with a plurality of relatively spaced apart, parallel ridges 26 extending the length of the profile inwardly from the front and rear legs 22 and 23. The ridges 26 may be integrally formed in the capstock 19 so as to be weatherable and suitable for providing a gripping surface when walked upon by spectators. The ridges 26 project approximately 0.03 inches above the planar intermediate surface of the top portion 21.

The front leg 22 of the bleacher cover 18 presents a smooth, uninterrupted surface from one end of the cover to the other. Said leg 22, like the web 21, is sized and configured to fit snugly against the adjacent surface of the bleacher stringer 11. Likewise, the rear leg 23 is sized and configured to fit snugly and resiliently against the rear side surface 16 of the stringer. It is recognized, however, that over the course of several years, the various surfaces of the bleacher seats become rough and uneven. Accordingly, the fit between the subject cover 18 and the wooden stringer 11 may not be as uniform as suggested by FIG. 5. Nevertheless, a snug and resilient fit is provided between substantial portions of the cover and bench. Any protrusions from the bench surfaces which substantially impair this fit may be reduced or removed by planing or scraping prior to installing the cover.

As indicated in FIGS. 2 and 5, the rear leg 23, like the front leg 22, presents a substantially flat, generally vertically disposed surface. However, horizontally elongated slots 27 extend through the rear leg 23. Fasteners 28, such as wood screws or nails with small shoulders thereon to prevent the nail head from pinching the leg against the rear side 16 of the bench, extend through the slots 27. In this matter, the thermoplastic cover 18 can expand and contract without breaking free of the fastener 28.

The marginal front flange 24 is adapted to snugly and resiliently engage the undersurface 14 of the wooden bleacher seat 11. The front leg 22 is dimensioned to assist the inturned front lip or flange 24 in resiliently engaging the undersurface 14 of the seat. In contrast, however, the rear peripheral lip or flange 25 is angled outwardly from the seat 11, for reasons explained more fully below. As previously indicated, the web portion 21 closely approximates the board in width. The angle between the web and each of the front and rear legs 22 and 23 is slightly less than 90°, so the legs 22 and 23 are angled inwardly. In this manner, said legs 22 and 23 resiliently engage the front and rear sides 15 and 16 of the wooden bleacher.

Preferably, the cover 18 is installed on the wooden bleacher 11 by first mounting the channel defined by the inturned flange 24, front leg 22 and forwardly disposed portions of the web 21 around the front side wall 15 and adjacent portions of the seat. As may be readily understood, the web 21 and leg 23 of the cover must be flexed in order for the marginal flange 25 to clear the upper rear corner 29 of the board. In view of the relative rigidity of the thermoplastic in both the capstock 19 and substrate 20, the outwardly turned rear flange 25 was provided to prevent the cover from cracking a result of being deformed beyond its resilient limit during installation. Furthermore, the outwardly turned rear flange 25 serves as a cam surface, thereby permitting the installer to simply push on the top portion adjacent to the rear leg 23 to deflect the marginal flange 25 and rear leg 23 outwardly and around the upper rear corner of 29 of the board. Once the cover is snugly in place and longitudinally centered on the stringer 11, the fasteners 28 are installed.

Figure 6:
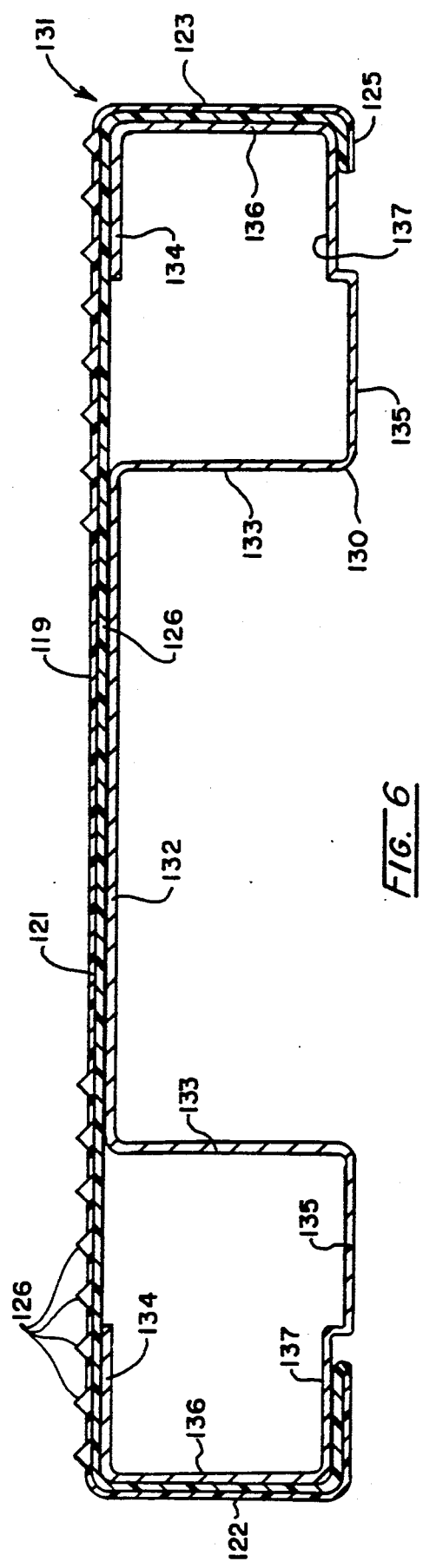
FIG. 6 is a vertical sectional view taken along line 6—6 of FIG. 1 and particularly illustrates the construction and manner of attachment of the second embodiment of the present invention as adapted for use on a bleacher or stadium beam formed from rolled steel.

In some instances, it is advisable or mandatory to replace the wooden stringers 11 on bleachers or in stadiums with metal beams 130, as indicated on the top bleacher tier in FIG. 1 and also in FIG. 6. The beam 130 is preferably formed from rolled steel and is configured to provide more than adequate strength when subjected to downwardly directed forces and to support an alternative embodiment, generally designated 131, of the present seat cover. More particularly, the steel beam 130 is formed with an upper central table 132, downturned intermediate walls 133, a pair of laterally disposed upper ledges 134 coplanar with the table 133, and horizontal bases 135 and outer vertical walls 136 connecting the ledges 134 with the intermediate walls 133. The vertical bleacher struts and crossties 12 may be welded or connected by suitable fasteners to the undersurface of the bases 135 and/or table portion 132. Preferably, the beam 130 is approximately equal in length and width to the wooden board 11 which it replaces.

The cover 131 is formed with a generally rigid and weatherable thermoplastic capstock 119 and a generally rigid substrate 120 in substantially the same manner as the previous embodiment 18 adapted for use with wooden stringers 11. Likewise, the ridges 126, web portion 121, front and rear legs 122 and 123 and front marginal flange 124 are substantially similar to their counterparts on the wooden seat cover 18. The most significant difference between the wooden beam cover 18 and metal beam cover 131 is in the configuration of the rear marginal flanges 25 and 125. As indicated in FIG. 6, the rear flange 125 on the metal seat cover 131 is inturned, rather than being angled outwardly as obtained on the wooden seat cover 18. Preferably, the rear flange 125 is somewhat shorter than the front flange 124, so that the amount of flexing to which the web and rear leg are subjected during installation does not exceed the elastic limit of the capstock or substrate. The chances of fracturing the cover 131 during installation is considered to be substantially less than if the rear flange 25 on the cover 18 for wooden seats were inturned. This difference is due primarily to the substantially greater dimensional and surface uniformity of the new steel beam 30 as compared to the old and weathered wooden beam 11.

Preferably, the bottom walls 135 of the beam 130 are formed with relatively inset portions 137 for engagement with the inturned front and rear peripheral flanges 124 and 125 of the cover. In view of the dimensional uniformity of the steel beam 130, the various portions of the thermoplastic cover 130 are adapted and configured to be disposed in more closely surrounding, resiliently engaging relationship therewith than is obtained between the cover and the wooden beam 11. Preferably, a snap fit is established when the rear side wall 123 and rear marginal flange 125 are fully mounted on the rear outer wall 136 and inset base portion 137 of the steel beam.

The closeness of the fit between the cover 131 and steel beam 131 reduces or eliminates the need for fasteners extending through both components. However, as indicated in FIG. 3, a molded synthetic resin cap 138 is preferably provided at a free end of the beam 130 and cover 131. The cap 138 may be molded in a manner well known in the art, with a plurality of projections (not shown) which, upon insertion into the end of the beam, provide a friction fit which reduces the opportunity for inadvertent dislocation of the cap. Further, as indicated in FIG. 4, a connector or baton 139 is preferably disposed in a gap 140 provided between relatively abutting beams and covers. The connector 139 may be fastened to one or the other of the covers 131 to permit the gap 140 to expand and contract as a result of the thermally induced movement of the covers.

It is contemplated that end caps 138 and connectors 139 would not be necessary on covers 18 for wooden beams, in view of the fasteners 28 extending directly between these two structures.

Figure 7:
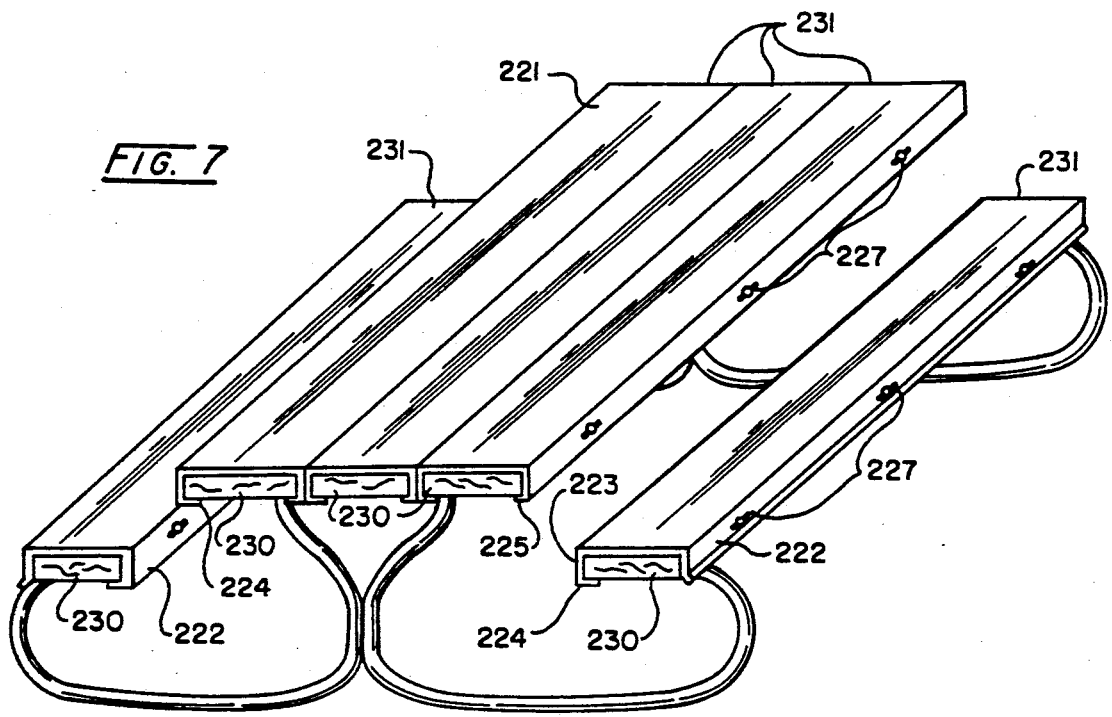
FIG. 7 is a perspective view of a picnic table and bench assembly whose beams or planks are equipped with the present thermoplastic cover.

As indicated in FIG. 7, the present thermoplastic cover 231 may be adapted for use on the planks or beams 230 which form the operative surfaces of a picnic table and bench assembly. The cover 231 is formed with a generally rigid and weatherable thermoplastic capstock and a generally rigid substrate in substantially the same manner as the previously described embodiments. Preferably, however, the outer surface of the web portion 221 is smooth, rather than ridged. It may also be noted that both of the marginal flanges 224 and 225 are inturned on the planks 230 forming the table top. In addition, both leg portions 222 and 223 are preferably formed with longitudinally extending fastener receiving slots 227.

Figure 8:
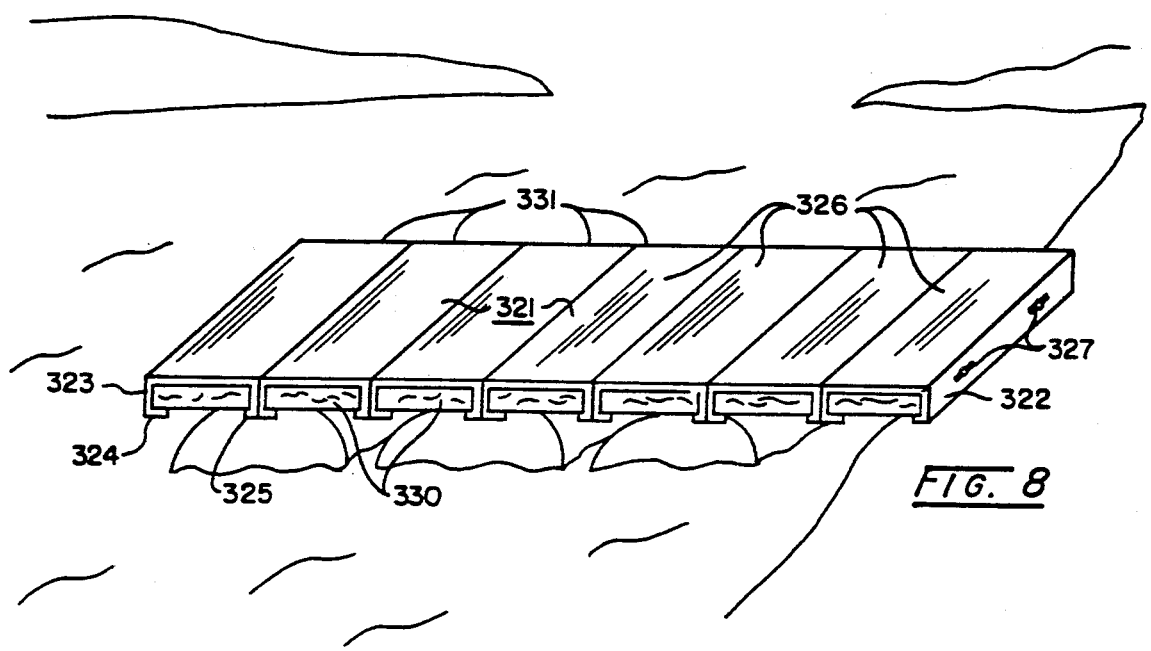
FIG. 8 is a perspective view of a boat dock whose planks are equipped with the present thermoplastic cover.

As indicated in FIG. 8, the present cover 331 may also be adapted for use on the planks or beams 330 which form the traffic-supporting surface of a boat dock. The subject cover 331 for the planks of a boat dock is preferably constructed with the same features as the covers for the picnic table/seat assembly shown in FIG. 7; however, the web portion 321 may be formed with ridges 326 for surer footing. Both marginal flanges 324 and 325 are preferably inturned and the leg portions 322 and 323 are each formed with at least one longitudinally extending, fastener receiving slot 327.

Thus it may be seen that the present invention is adapted for use on both old wooden beams and planks, as well as upon replacement or original metal beams. Further, the present thermoplastic beam is considerably more comfortable than wooden and metal beams, and is relatively inexpensive, durable, easily installed and attractive.

While alternative embodiments of the present invention have been set forth in some detail, the foregoing illustrations and written description are not intended to unduly limit the spirit or gist of the invention nor the scope of the following claims.

We claim:

1. An elongated one-piece cover for a plank or beam, said cover comprising: a weatherable generally rigid thermoplastic cap coextruded with a generally rigid thermoplastic substrate, said cap and substrate defining a generally channel-shaped profile which includes a web portion adapted for close fitting engagement with an upper surface of the plank or beam, a pair of relatively opposing leg portions adapted for close fitting resilient engagement with front and rear side surfaces of said plank or beam, and a marginal flange extending from each of the leg portions, at least one of said marginal flanges being relatively inturned and adapted for close fitting, resilient engagement with an undersurface of the plank or beam.

2. The cover according to claim 1, wherein one of the marginal flanges is relatively inturned and the other marginal flange is angled outwardly relative to the channel-shaped profile.

3. A cover according to claim 1, wherein at least one longitudinally extending fastener-receiving slot is formed in at least one of the leg portions.

4. A cover according to claim 1, wherein a plurality of relatively spaced apart longitudinally extending ridges project upwardly from the web portion of said cover.

5. The cover according to claim 1, wherein the plank or beam is adapted for use in stadium or bleacher seating.

6. The cover according to claim 1, wherein the plank or beam is adapted for use in a picnic table.

7. The cover according to claim 1, wherein the plank or beam is adapted for use in a boat dock.

8. A cover according to claim 1, wherein both of the marginal flanges are inturned.

9. The cover according to claim 1, wherein said cover is adapted to be snap fitted onto a plank or beam formed from steel.

10. The cover according to claim 1, wherein a molded synthetic resin cap is adapted for attachment to a relatively open end of the plank or beam.

11. The cover according to claim 1, wherein a molded synthetic resin connector is provided at a juncture between two of said covers disposed in end to end relation to one another.

* * * * *